US012602054B2

(12) United States Patent
Matsunaga et al.

(10) Patent No.: US 12,602,054 B2
(45) Date of Patent: Apr. 14, 2026

(54) CONTROL DEVICE FOR MOBILE OBJECT, CONTROL METHOD FOR MOBILE OBJECT, AND STORAGE MEDIUM

(71) Applicant: HONDA MOTOR CO., LTD., Tokyo (JP)

(72) Inventors: Hideki Matsunaga, Wako (JP); Takashi Matsumoto, Wako (JP); Ryoji Wakayama, Wako (JP); Koki Aizawa, Wako (JP); Kento Shirakata, Wako (JP); Yunosuke Kuramitsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 335 days.

(21) Appl. No.: 18/125,148

(22) Filed: Mar. 23, 2023

(65) Prior Publication Data

US 2023/0305567 A1 Sep. 28, 2023

(30) Foreign Application Priority Data

Mar. 28, 2022 (JP) ................................. 2022-051900

(51) Int. Cl.
*G05D 1/244* (2024.01)
*G05D 1/00* (2024.01)
*G05D 1/241* (2024.01)

(52) U.S. Cl.
CPC ........... *G05D 1/244* (2024.01); *G05D 1/0214* (2013.01); *B60W 2552/45* (2020.02); *G05D 1/241* (2024.01)

(58) Field of Classification Search
CPC ...... G05D 1/0214; G05D 1/241; G05D 1/244; G05D 1/0227; B60W 2552/35; B60W 2552/45; B60W 40/06
See application file for complete search history.

(56) References Cited

U.S. PATENT DOCUMENTS

2016/0221581 A1* 8/2016 Talwar ................... G01N 29/14
2018/0157256 A1* 6/2018 Oniwa .............. B60W 60/0051
(Continued)

FOREIGN PATENT DOCUMENTS

EP 1834867 9/2007
JP 2004024853 A * 1/2004
(Continued)

OTHER PUBLICATIONS

Yoshida, T., et al., "Braille Block Detection for Autonomous Mobile Robot Navigation", 2000, Proceedings of the 2000 IEEE/RSJ International Conference on Intelligent Robots and Systems, pp. 633-638 (Year: 2000).*
(Continued)

Primary Examiner — Harry Y Oh
Assistant Examiner — Karston G. Evans
(74) Attorney, Agent, or Firm — Amin, Turocy & Watson, LLP

(57) ABSTRACT

Provided is a control device for a mobile object capable of moving on a roadway and a predetermined area different from the roadway, the control device comprising a storage device storing a program and a hardware processor connected to the storage device, the hardware processor executing the program stored in the storage device to: recognize whether the mobile object is moving on the roadway or the predetermined area based on an output of an acceleration sensor for detecting an acceleration of the mobile object; and recognize that the mobile object is moving on the predetermined area when the mobile object is determined to reach a braille block based on the output of the acceleration sensor.

8 Claims, 6 Drawing Sheets

(56) References Cited

U.S. PATENT DOCUMENTS

| 2018/0340794 A1* | 11/2018 | Okamoto | G01C 21/3822 |
| 2020/0047342 A1* | 2/2020 | Lee | G05D 1/0227 |
| 2022/0234589 A1* | 7/2022 | Cserna | B60W 40/06 |
| 2023/0148350 A1* | 5/2023 | Park | G06Q 40/08 |
| | | | 701/1 |
| 2024/0021073 A1* | 1/2024 | Kudo | G01C 21/20 |

FOREIGN PATENT DOCUMENTS

| JP | 2004-110590 | 4/2004 | |
| JP | 2004-184089 | 7/2004 | |
| JP | 2007-245826 | 9/2007 | |
| JP | 2009-102807 | 5/2009 | |
| JP | 2018-200679 | 12/2018 | |
| JP | 2019-197328 | 11/2019 | |
| JP | 2020-168953 | 10/2020 | |
| KR | 101343543 B1 * | 1/2014 | A61H 3/06 |

OTHER PUBLICATIONS

Japanese Office Action for Japanese Patent Application No. 2022-051900 mailed Jul. 22, 2025.

* cited by examiner

EXAMPLE OF WAVEFORM OF GUIDANCE BLOCK 202

EXAMPLE OF WAVEFORM OF WARNING BLOCK 203

CONTROL DEVICE FOR MOBILE OBJECT, CONTROL METHOD FOR MOBILE OBJECT, AND STORAGE MEDIUM

CROSS-REFERENCE TO RELATED APPLICATION

The application is based on Japanese Patent Application No. 2022-051900 filed on Mar. 28, 2022, the content of which incorporated herein by reference.

BACKGROUND

Field of the Invention

The present invention relates to a control device for a mobile object, a control method for the mobile object, and a storage medium.

Description of Related Art

Hitherto, mobile objects that can move on both sidewalks and roadways have been put to practical use, and in such cases, it is necessary for the mobile object to recognize whether it is moving on the sidewalk or roadway. For example, Japanese Patent Application Laid-Open No. 2020-168953 discloses the technology of recognizing a sidewalk based on a peripheral image obtained by photographing the surrounding condition of a mobile object.

However, the related art totally depends on a peripheral image obtained by photographing the surrounding condition of a mobile object in order to recognize a sidewalk, and a sidewalk cannot be recognized without using a peripheral image in some cases.

SUMMARY

The present invention has been made in view of the above mentioned circumstances, and has an object to provide a control device for a mobile object, a control method for the mobile object, and a storage medium that are capable of recognizing a sidewalk without using a peripheral image of a mobile object.

A control device for a mobile object, a control method for the mobile object, and a storage medium according to the present invention adopt the following configuration.

(1): According to one aspect of the present invention, there is provided a control device for a mobile object capable of moving on a roadway and a predetermined area different from the roadway, the control device including a storage device storing a program and a hardware processor connected to the storage device, the hardware processor executing the program stored in the storage device to: recognize whether the mobile object is moving on the roadway or the predetermined area based on an output of an acceleration sensor for detecting an acceleration of the mobile object; and recognize that the mobile object is moving on the predetermined area when the mobile object is determined to reach a braille block based on the output of the acceleration sensor.

(2): In the aspect (1), when the hardware processor has recognized a candidate object for the braille block based on an output of an external condition detection device for detecting an external condition of the mobile object, the hardware processor causes the mobile object to move on the candidate object, and the hardware processor determines whether or not the mobile object has reached the braille block based on the output of the acceleration sensor at a time when the mobile object has passed through the candidate object.

(3): In the aspect (1), the hardware processor determines whether or not the mobile object has reached the braille block based on a degree of similarity between an output vibration pattern output by the acceleration sensor and a reference vibration pattern at a time when the mobile object moves on the braille block, which is stored in advance.

(4): In the aspect (3), the braille block includes a linear braille block and a dotted braille block, and the hardware processor determines whether or not the mobile object has reached the braille block based on degrees of similarity between the output vibration pattern output and reference vibration patterns for the linear braille block and the dotted braille block.

(5): In the aspect (1), the hardware processor determines whether or not the mobile object has reached the braille block by inputting an output vibration pattern output by the acceleration sensor into a trained model that is trained to receive input of a vibration pattern to output an indicator value indicating whether or not the vibration pattern is a vibration pattern at a time when the mobile object moves on the braille block.

(6): In the aspect (5), the braille block includes a linear braille block and a dotted braille block, and the hardware processor determines whether or not the mobile object has reached the braille block by inputting the output vibration pattern output by the acceleration sensor into a trained model that is trained to receive input of a vibration pattern to output an indicator value indicating whether or not the vibration pattern is a vibration pattern at a time when the mobile object moves on the liner braille block or the dotted braille block.

(7): According to another aspect of the present invention, there is provided a control method for a mobile object to be executed by a computer for controlling a mobile object capable of moving on a roadway and a predetermined area different from the roadway, the control method including: recognizing whether the mobile object is moving on the roadway or the predetermined area based on an output of an acceleration sensor for detecting an acceleration of the mobile object; and recognizing that the mobile object is moving on the predetermined area when the mobile object is determined to reach a braille block based on the output of the acceleration sensor.

(8): According to another aspect of the present invention, there is provided a non-transitory computer-readable storage medium storing a program for causing a computer for controlling a mobile object capable of moving on a roadway and a predetermined area different from the roadway to: recognize whether the mobile object is moving on the roadway or the predetermined area based on an output of an acceleration sensor for detecting an acceleration of the mobile object; and recognize that the mobile object is moving on the predetermined area when the mobile object is determined to reach a braille block based on the output of the acceleration sensor.

According to the aspects (1) to (8), it is possible to recognize a sidewalk without using a peripheral image of a mobile object.

DESCRIPTION OF EMBODIMENTS

Figure 1:
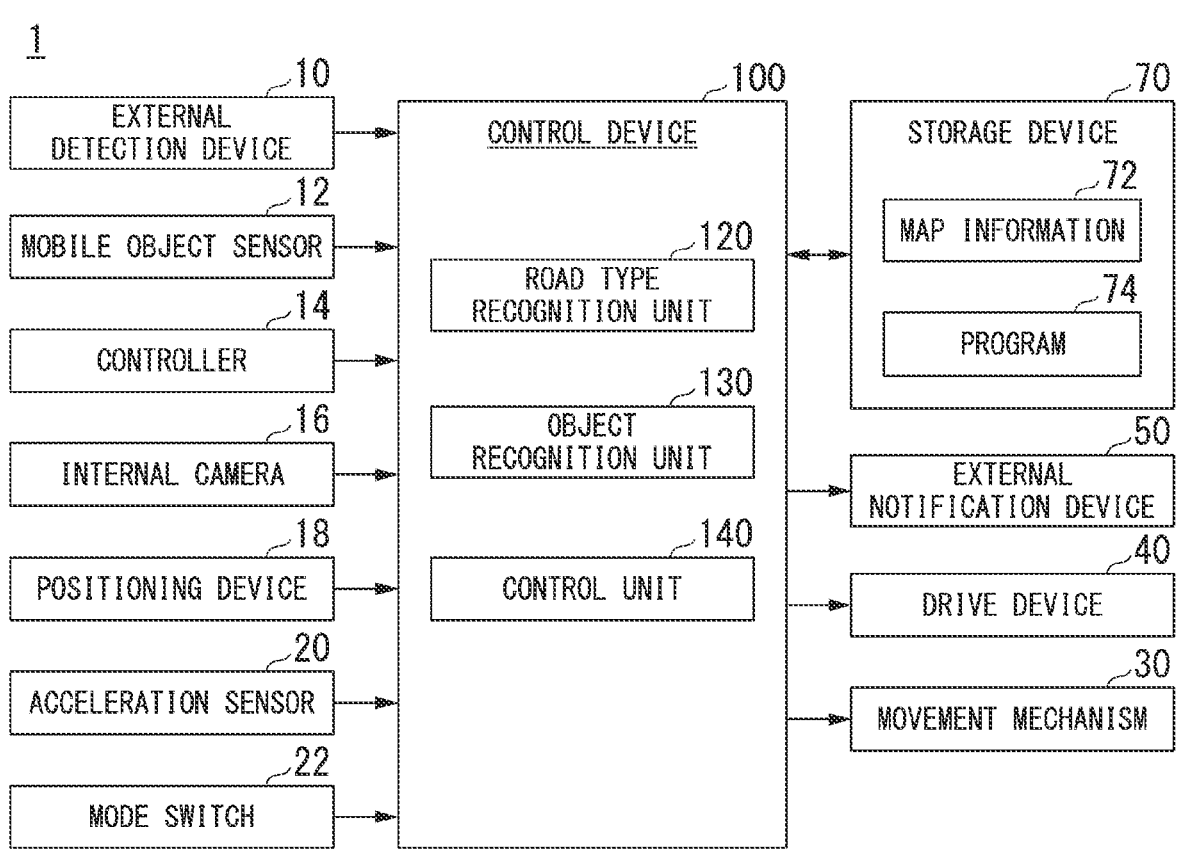
FIG. 1 is a diagram illustrating an exemplary configuration of a mobile object and a control device according to an embodiment.

Now, referring to the drawings, description is given of a control device for a mobile object, a control method for the mobile object, and a storage medium according to an embodiment of the present invention. The mobile object moves on both of a roadway and a predetermined area different from the roadway. The mobile object is sometimes referred to as "micro mobility". An electric scooter is a type of the micro mobility. The mobile object may be a vehicle that can accommodate a person, or may be an autonomous mobile object. The latter autonomous mobile object is used for conveying a package or the like, for example. The predetermined area is, for example, a sidewalk. Further, the predetermined area may be a part or all of roadside strips, bicycle lanes, and public open spaces, and the like, or may include all of the pedestrian road, roadside strips, bicycle lanes, and public open spaces, and the like. In the following description, it is assumed that the predetermined area is a sidewalk. The part described as "pedestrian road" in the following description can be replaced with "predetermined area" as appropriate.

FIG. 1 is a diagram illustrating an exemplary configuration of a mobile object 1 and a control device 100 according to an embodiment. The mobile object 1 includes, for example, an external detection device 10, a mobile object sensor 12, a controller 14, an internal camera 16, a positioning device 18, an acceleration sensor 20, a mode switch 22, a movement mechanism 30, a drive device 40, an external notification device 50, a storage device 70, and a control device 100. A part of components not indispensable for implementing the features of the present invention may be omitted among those components.

The external detection device 10 includes various kinds of devices having the movement direction of the mobile object 1 as its detection range. The external detection device 10 includes, for example, an external camera, a radar device, a LIDAR (Light Detection and Ranging) device, and a sensor fusion device. The external detection device 10 outputs information indicating detection results (image, object position, and other information) to the control device 100.

The mobile object sensor 12 includes, for example, a speed sensor, a yaw rate (angular velocity) sensor, an azimuth sensor, and an operation amount detection sensor mounted to the controller 14. The controller 14 may include, for example, a controller (for example, acceleration pedal or brake pedal) for giving an instruction to accelerate/decelerate, and a controller (for example, steering wheel) for giving an instruction to perform steering. In this case, the mobile object sensor 12 may include an acceleration position sensor, a brake depression amount sensor, a steering torque sensor, and other sensors. In this case, the mobile object sensor 12 may include an acceleration position sensor, a brake depression amount sensor, a steering torque sensor, and other sensors. The mobile object 1 may include, as the controller 14, a controller (for example, non-circular rotary controller, joystick, button, or the like) other than those described above.

The internal camera 16 photographs at least the head of the occupant of the mobile object 1 from the front. The internal camera 16 is a digital camera using an image pickup device such as a CCD (Charge Coupled Device) device or a CMOS (Complementary Metal Oxide Semiconductor) device. The internal camera 16 outputs the picked up image to the control device 100.

The positioning device 18 is a device that measures the position of the mobile object 1. The positioning device 18 is, for example, a GNSS (Global Navigation Satellite System) receiver, and identifies the position of the mobile object 1 based on a signal received from the GNSS receiver to output the identified position as position information. The position information of the mobile object 1 may be estimated from the position of a Wi-Fi base station to which a communication device described later is connected.

The acceleration sensor 20 detects the acceleration of the mobile object 1, and outputs a signal that depends on the detected acceleration to the control device 100. The acceleration sensor 20 detects an acceleration acting on the vertical direction (height direction) in addition to the horizontal direction of the mobile object 1.

The mode switch 22 is a switch that is operated by the occupant. The mode switch 22 may be a mechanical switch, or a GUI (Graphical User Interface) switch set on the touch panel of the HMI 20. The mode switch 22 receives an operation of switching between driving modes including a mode A, which is an assist mode in which one of a steering operation and an acceleration/deceleration control is performed by the occupant and the other is performed automatically (in mode A-1, a steering operation is performed by the occupant and acceleration/deceleration control is performed automatically, whereas in mode A-2, acceleration/deceleration control is performed by the occupant and a steering operation is performed automatically), a mode B, which is a manual driving mode in which a steering operation and acceleration/deceleration control are performed by the occupant, and a mode C, which is an automatic driving mode in which a steering operation and acceleration/deceleration control are performed automatically.

The movement mechanism 30 is a mechanism for causing the mobile object 1 to move on a road. The movement mechanism 30 is, for example, a group of wheels including steered wheels and drive wheels. Further, the movement mechanism 30 may be legs for multi-legged walking.

The drive device 40 outputs a force to the movement mechanism 30 to cause the mobile object 1 to move. For example, the drive device 40 includes a motor for driving a drive wheel, a battery for storing power to be supplied to the motor, and a steering device for adjusting the steering angle of the steered wheel. The drive device 40 may include, for example, an internal combustion engine or a fuel battery as drive force output means or power generation means. The drive device 40 may further include a brake device that operates by using a friction force or air resistance.

The external notification device 50 is, for example, a lamp, display device, or speaker that is installed on an external plate of the mobile object 1 and provides information to the outside of the mobile object 1. The external notification device 50 operates differently between when the mobile object 1 is moving on a sidewalk and when the mobile object 1 is moving on a roadway. For example, the external notification device 50 is controlled so as to cause the lamp to emit light when the mobile object 1 is moving a sidewalk or cause the lamp not to emit light when the mobile object 1 is moving on a roadway. The color of light emitted by this lamp is preferably a color defined in law. The external notification device 50 may be controlled so as to cause the lamp to emit green light when the mobile object 1 is moving a sidewalk or cause the lamp not to emit blue light when the mobile object 1 is moving on a roadway. When the external notification device 50 is a display device, the external notification device 50 displays text or graphic indicating that "the mobile object 1 is traveling on a sidewalk" when the mobile object 1 is traveling on a sidewalk.

Figure 2:
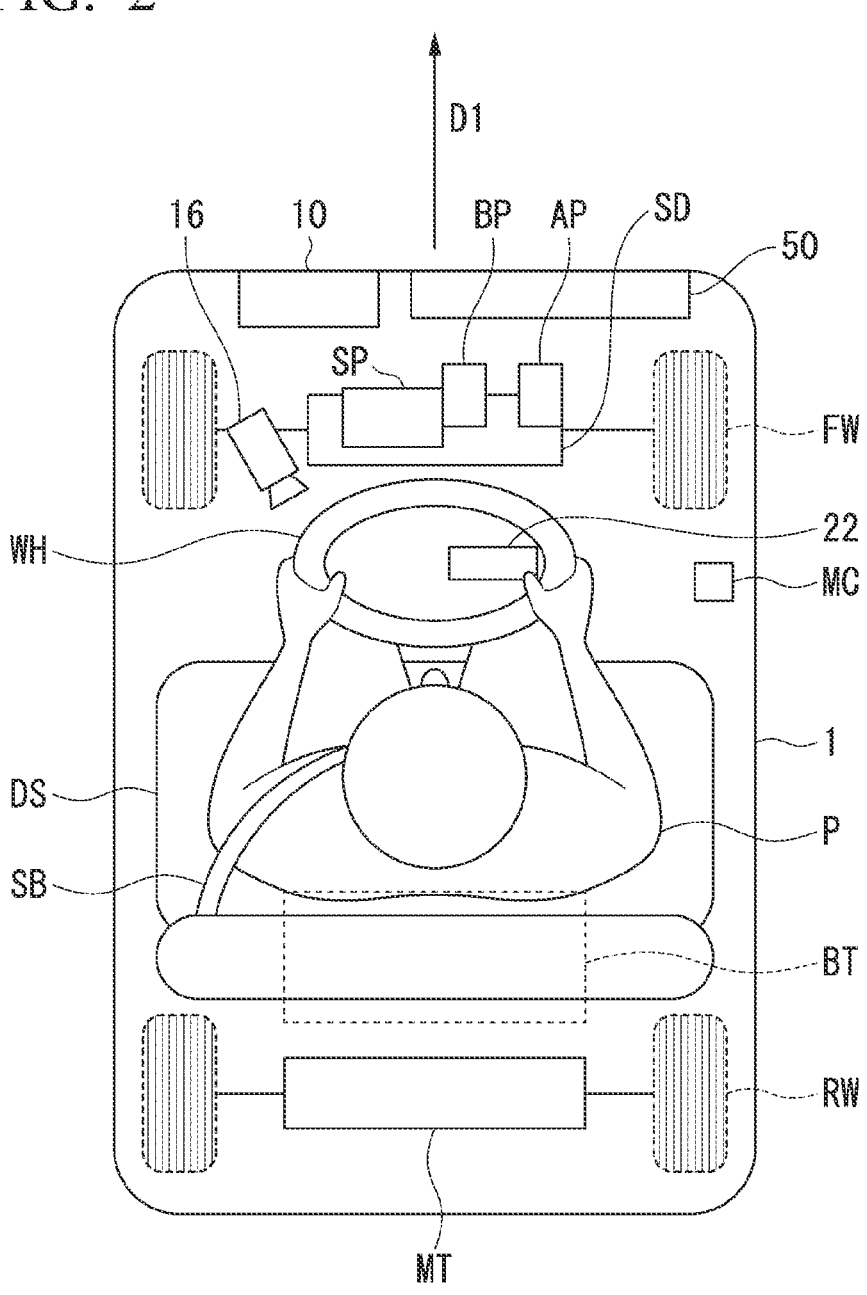
FIG. 2 is a perspective view of the mobile object 1 from the above.

FIG. 2 is a perspective view of the mobile object 1 from the above. In FIG. 2, FW represents a steered wheel, RW represents a drive wheel, SD represents a steering device, MT represents a motor, and BT represents a battery. The steering device SD, the motor MT, and the battery BT are included in the drive device 40. Further, AP represents an acceleration pedal, BP represents a brake pedal, WH represents a steering wheel, SP represents a speaker, and MC represents a microphone. The mobile object 1 is a one-passenger mobile object, and the occupant P is sitting on a driver seat DS with his or her seatbelt SB fastened. An arrow D1 represents the traveling direction (speed vector) of the mobile object 1. The external detection device 10 is provided around the front end of the mobile object 1, the internal camera 16 is provided at a position so as to be capable of photographing the head of the occupant P, and the mode switch 22 is provided in the boss section of the steering wheel WH. Further, the external notification device 50 serving as a display device is provided around the front end of the mobile object 1.

Referring back to FIG. 1, the storage device 70 is, for example, a non-transitory storage device such as a hard disk drive (HDD), a flash memory, or a random access memory (RAM). The storage device 70 stores, for example, navigation map information 72, a trained model 73, and other information. In FIG. 1. the storage device 70 is described outside of the control device 100, but the storage device 70 may be included in the control device 100.

[Control Device]

The control device 100 includes, for example, a road type recognition unit 120, an object recognition unit 130, and a control unit 140. The road type recognition unit 120, the object recognition unit 130, and the control unit 140 are implemented by a hardware processor such as a CPU (Central Processing Unit) executing a program (software), for example. A part or all of these components may be implemented by hardware (circuit unit including circuitry) such as an LSI (Large Scale Integration), an ASIC (Application Specific Integrated Circuit), an FPGA (Field-Programmable Gate Array), or a GPU (Graphics Processing Unit), or may be implemented through cooperation between software and hardware. The program may be stored in the storage device 70 or may be stored in a removable storage medium (non-transitory storage medium) such as a DVD or CD-ROM and the storage medium may be attached to a drive device to install the program into the storage device 70.

The road type recognition unit 120 is recognizing whether the mobile object 1 is moving on a roadway or sidewalk. For example, the road type recognition unit 120 analyzes an image photographed by the external camera of the external detection device 10 to recognize whether the mobile object 1 is moving on a roadway or sidewalk. The road type recognition unit 120 further determines whether the mobile object 1 has reached a braille block on the basis of an output of the acceleration sensor 20, and when it is determined that the mobile object 1 has reached a braille block, the road type recognition unit 120 recognizes that the mobile object 1 is moving on the sidewalk. A specific method of determining whether the mobile object 1 has reached a braille block is described later.

The object recognition unit 130 recognizes an object existing near the mobile object 1 on the basis of the output of the external detection device 10. Objects include some or all of the following: mobile objects such as vehicles, bicycles, and pedestrians; runway boundaries such as road dividing lines, bumps, guardrails, shoulders, and median strip; structures on the road such as road signs and billboards; and obstacles such as (falling) objects on the road. The object recognition unit 130 obtains information such as the existence, location, and type of other mobile objects by inputting an image photographed by the external camera of the external detection device 10 into a trained model that is trained to output information such as the existence, location, and type of an object by receiving input of an image photographed by the external camera. The types of other mobile objects can also be estimated on the basis of the size of the image or the intensity of a reflected wave received by the radar device of the external detection device 10. Further, for example, the object recognition unit 130 acquires the speed of another mobile object detected by the radar device using a Doppler effect or the like.

The control unit 140 control the drive device 40 according to a set driving mode, for example. The mobile object 1 may execute only a part of the following driving modes, but in any case, the control unit 140 changes the speed limit value depending on whether the mobile object 1 is moving on a roadway or sidewalk. In that case, the mode switch 22 may be omitted.

In the mode A-1, the control unit 140 refers to the road type information based on the output of the road type recognition unit 120 and travel path/object information based on the output of the object recognition unit 130 to determine whether mobile object 1 is moving on a roadway. When the mobile object 1 is moving on a roadway, the control unit 140 controls the motor MT of the drive device 40 so that the mobile object 1 maintains a certain distance from an object in front of the mobile object 1 above a certain distance, and if the distance from the object in front of the mobile object 1 is sufficiently long, the mobile object 1 moves at a first speed V1 (e.g., more than 10 kilometers per hour [km/h] and less than several tens of kilometers per hour [km/h]). When the mobile object 1 is moving on a sidewalk, the control unit 140 controls the motor MT of the drive device 40 so that the mobile object 1 maintains a certain distance from an object in front of the mobile object 1 above a certain distance, and if the distance from the object in front of the mobile object 1 is sufficiently long, the mobile object 1 moves at a second speed V2 (e.g., less than 10 kilometers per hour [km/h]). Such features are similar to the ACC (Adaptive Cruise Control) feature of a vehicle in which the first speed V1 or the second speed V2 is set as a set speed, and the feature used in ACC can be used therefor. Further, in the mode A-1, the control unit 140 controls the steering device SD so as to change the steering angle of the steered wheel on the basis of the operation amount of the controller 14 such as a steering wheel. Such a feature is similar to that of a power steering device, and the feature used in a power steering device can be used therefor. Without electronic control with respect to steering, the mobile object 1 may have a steering device in which the operator 14 and the steering mechanism are mechanically coupled.

In the mode A-2, the control unit 140 refers to the road type information based on the output of road type recognition unit 120 and the travel path/object information based on the output of object recognition unit 130 to generate a target trajectory that enables the mobile object 1 to avoid objects in the travel path, and controls the steering device SD of the drive device 40 so that the mobile object 1 moves along the target trajectory. With respect to acceleration and deceleration, the control unit 140 controls the motor MT of the drive device 40 based on the speed of mobile object 1 and the amount of operation of the accelerator pedal or brake pedal. The control unit 140 controls the motor MT of the drive device 40 with the first speed V1 as the upper speed limit when the mobile object 1 is moving on a roadway (in the case of mode A-2, when the upper speed limit is reached, it means that the mobile object 1 is not accelerated even if further acceleration is indicated). When the mobile object 1 is moving on a sidewalk, the control unit 140 controls the drive device 40 with the second speed V2 as the upper speed limit In the mode B, the control unit 140 controls the motor MT of the drive device 40 based on the speed of mobile object 1 and the amount of operation of the accelerator pedal or brake pedal. The control unit 140 controls the motor MT of the drive device 40 with the first speed V1 as the upper speed limit when the mobile object 1 is moving on a roadway based on the road type information based on the output of the road type recognition unit 120 (in the case of mode B, when the upper speed limit is reached, it means that the mobile object 1 is not accelerated even if further acceleration is indicated). When the mobile object 1 is moving on a sidewalk, the control unit 140 controls the drive device 40 with the second speed V2 as the upper speed limit. The same configuration as the mode A-1 holds true for steering.

In the mode C, the control unit 140 refers to the road type information based on the output of road type recognition unit 120 and the travel path/object information based on the output of object recognition unit 130 to generate a target trajectory that enables the mobile object 1 to avoid objects in the travel path, and controls the drive device 40 so that the mobile object 1 moves along the target trajectory. Also in the mode C, the control unit 140 controls the drive device 40 with the first speed V1 as the upper speed limit when the mobile object 1 is moving on a roadway, and controls the drive device 40 with the second speed V2 as the upper speed limit when the mobile object 1 is moving on a sidewalk.

[Detection of Braille Block]

As described above, when the road type output by the road type recognition unit 120 is a sidewalk, the control unit 140 decreases the movement speed of the mobile object 1 compared to the case where the road type is a roadway. That is, the road type recognition unit 120 is required to accurately recognize the road type in order to enable traveling of the mobile object 1 on both of a roadway and a sidewalk. Thus, as described above, the road type recognition unit 120 analyzes the image photographed by the external camera to recognize whether the mobile object 1 is moving on a roadway or sidewalk, but image analysis is not always accurate. This embodiment recognizes the road type by detecting a braille block on a sidewalk without depending on the image photographed by the external camera.

Figure 3:
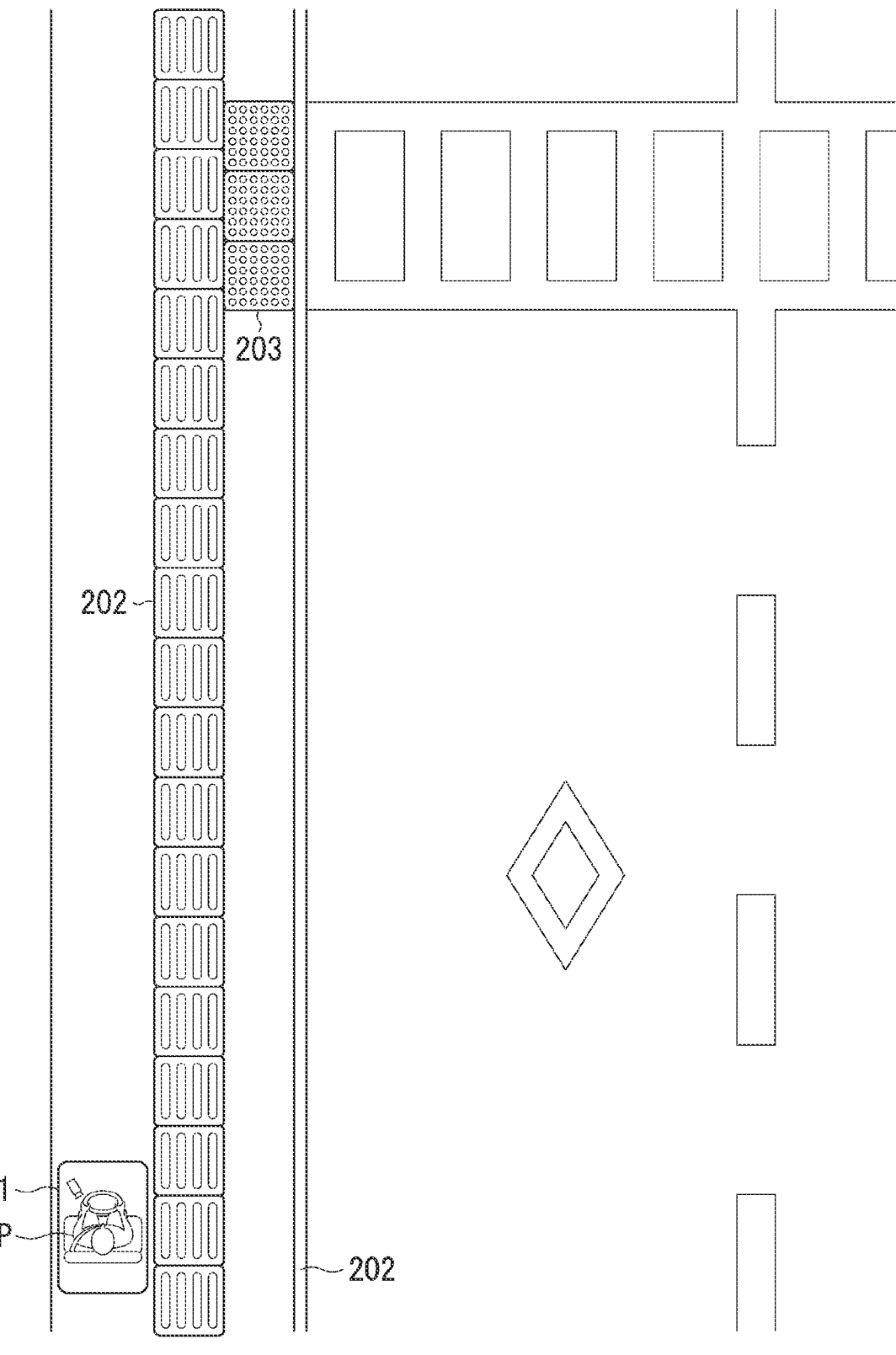
FIG. 3 is a diagram illustrating an example of a scene in which the road type recognition unit 120 detects a braille block.

FIG. 3 is a diagram illustrating an example of a scene in which the road type recognition unit 120 detects a braille block. The braille block includes, for example, a guidance block 202 (example of "linear braille block") and a warning block 203 (example of "dotted braille block"). The guidance block 202 has a plurality of linear protrusions. The linear protrusions are installed on the surface of a block, and the long-side direction of the linear protrusions indicates a direction of movement of a specific pedestrian. The warning block 203 has a plurality of dotted protrusions. Theses dotted protrusions are installed on the surface of a block. The plurality of dotted protrusions issue a warning to a specific pedestrian. For example, the warning block 203 is installed in front of stairs, in front of crosswalks, at junctions where the guidance blocks 202 cross, in front of information boards, in front of obstacles, at the edge of station platforms, etc. FIG. 3 represents an example of the warning block 203 installed in front of crosswalks.

Figure 4:
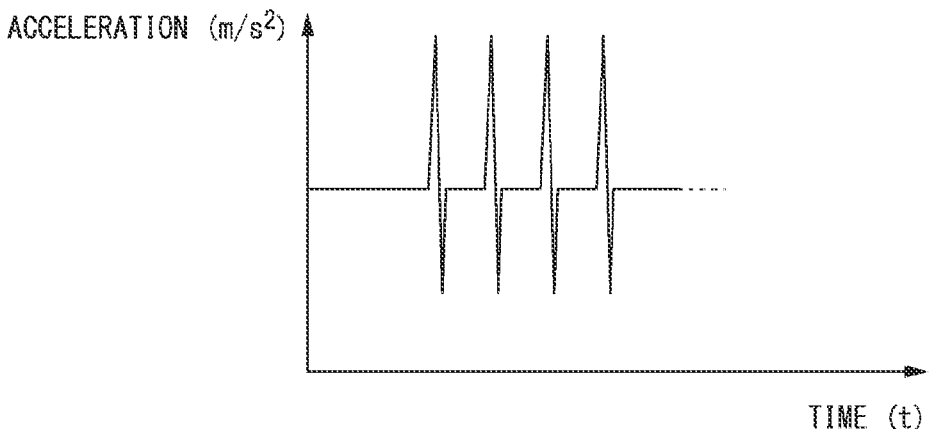
FIG. 4 is a diagram illustrating an example of the graph of a vibration pattern of an acceleration output by the acceleration sensor when the mobile object travels through a guidance block.

FIG. 4 is a diagram illustrating an example of the graph of a vibration pattern of an acceleration output by the acceleration sensor 20 when the mobile object 1 travels through the guidance block 202. In the graph of FIG. 4, the horizontal axis represents time, and the vertical axis represents acceleration. The road type recognition unit 120 calculates the degree of similarity between the vibration pattern (in other words, time-series data of output values of acceleration sensor 20) of an acceleration output by the acceleration sensor 20 and a reference vibration pattern stored in advance when the mobile object 1 travels through the guidance block 202, for example. When the calculated degree of similarity is equal to or larger than a threshold value, the road type recognition unit 120 determines that the mobile object 1 has reached a braille block (in this case, the phrase "reached" means both of a case in which the mobile object 1 is stopped on a braille block and a case in which the mobile object 1 is passing through a braille block), and recognizes the road type as a sidewalk. In this case, the degree of similarity between waveforms may be calculated by any technique, and for example, the cumulative value of Euclidean distances (relating to sampling data) between the output vibration pattern and the reference vibration pattern may be calculated as the degree of similarity. Further, for example, a plurality of patterns of the reference vibration pattern may be prepared for each angle at which the mobile object 1 is expected to move onto the guidance block 202.

Figure 5:
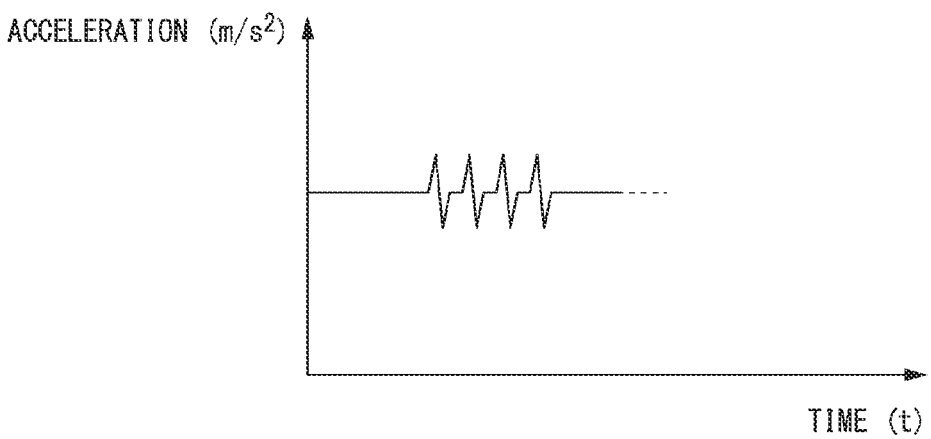
FIG. 5 is a diagram illustrating an example of the graph of a vibration pattern of an acceleration output by the acceleration sensor when the mobile object travels through a warning block.

FIG. 5 is a diagram illustrating an example of the graph of a vibration pattern of an acceleration output by the acceleration sensor 20 when the mobile object 1 travels through the warning block 203. In the graph of FIG. 5, the horizontal axis represents time, and the vertical axis represents acceleration. Similarly to the case of the guidance block 202, the road type recognition unit 120 calculates the degree of similarity between the vibration pattern of an acceleration output by the acceleration sensor 20 and a reference vibration pattern stored in advance when the mobile object 1 travels through the warning block 203. When the calculated degree of similarity is equal to or larger than a threshold value, the road type recognition unit 120 determines that the mobile object 1 has reached a braille block, and recognizes the road type as a sidewalk. In general, contrary to the guidance block 202 on which thick linear protrusions are arranged, fine dotted protrusions are arranged on the warning block 203. Thus, as an example in this embodiment, the vibration pattern illustrated in FIG. 5 has a smaller magnitude of vibration and higher frequency than the vibration pattern illustrated in FIG. 4, but the waveform of the reference vibration pattern is not limited to such a shape.

The methods according to FIG. 4 and FIG. 5 detect the vibration pattern of an acceleration and the road type by comparing the vibration pattern of an acceleration output by the acceleration sensor 20 with the reference vibration pattern prepared in advance. However, the present invention is not limited to such a configuration, and the road type recognition unit 120 may detect a braille block by using a trained model that is trained to received input of a vibration pattern to output an indicator value indicating whether or not the vibration pattern is a vibration pattern at a time when the mobile object 1 moves on a braille block.

Figure 6:
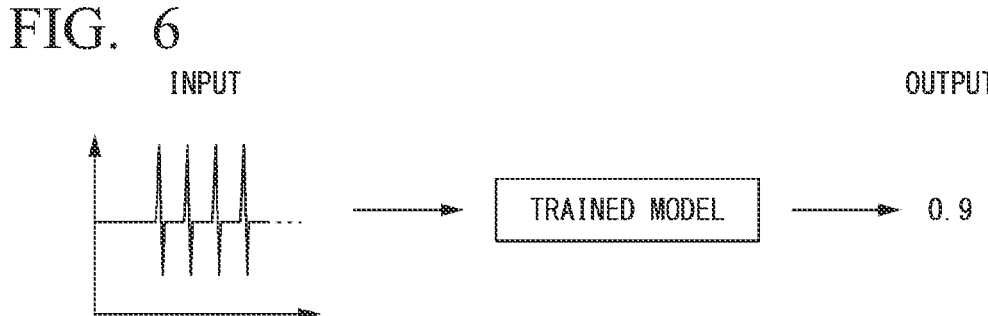
FIG. 6 is a diagram for describing a method of detecting a braille block using a trained model by a road type recognition unit.

FIG. 6 is a diagram for describing a method of detecting a braille block using a trained model by the road type recognition unit 120. For example, the operator of the mobile object 1 collects in advance, as training data, data of a vibration pattern at a time when the mobile object 1 moves on a braille block (guidance block 202 and/or warning block 203), and trains a machine learning model using the training data to generate a trained model. FIG. 6 represents an exemplary trained model that is trained to receive input of a vibration pattern to output a probability (example of "indicator value") of whether or not the vibration pattern is a vibration pattern at a time when the mobile object 1 moves on a braille block. When the probability output by the trained model is equal to or larger than a threshold value, the road type recognition unit 120 determines that the mobile object 1 has reached a braille block, and recognizes the road type as a sidewalk. The trained model may be generated separately for each of the guidance block 202 and the warning block 203.

Figure 7:
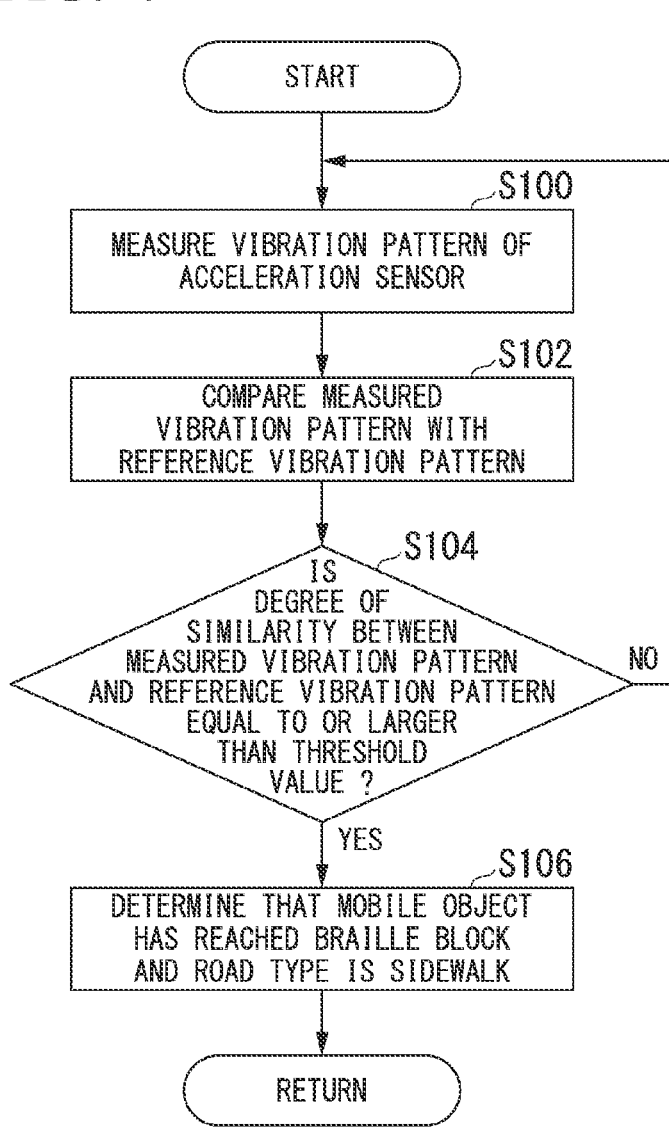
FIG. 7 is a flow chart illustrating an example of a flow of processing to be executed by the road type recognition unit.

FIG. 7 is a flow chart illustrating an example of a flow of processing to be executed by the road type recognition unit 120. First, the road type recognition unit 120 receives the output values of the acceleration sensor 20 in time series to measure the vibration pattern (Step S100). Next, the road type recognition unit 120 calculates the degree of similarity by comparing the measured vibration pattern with the reference vibration pattern of a braille block stored in advance (Step S102).

Next, the road type recognition unit 120 determines whether or not the calculated degree of similarity is equal to or larger than a threshold value (Step S104). When it is determined that the calculated degree of similarity is not equal to or larger than the threshold value, the road type recognition unit 120 returns the processing to Step S100. On the other hand, when it is determined that the calculated degree of similarity is equal to or larger than the threshold value, the road type recognition unit 120 determines that the mobile object 1 has reached a braille block, and recognizes the road type as a sidewalk (Step S106). This concludes the processing of this flow chart.

Figure 8:
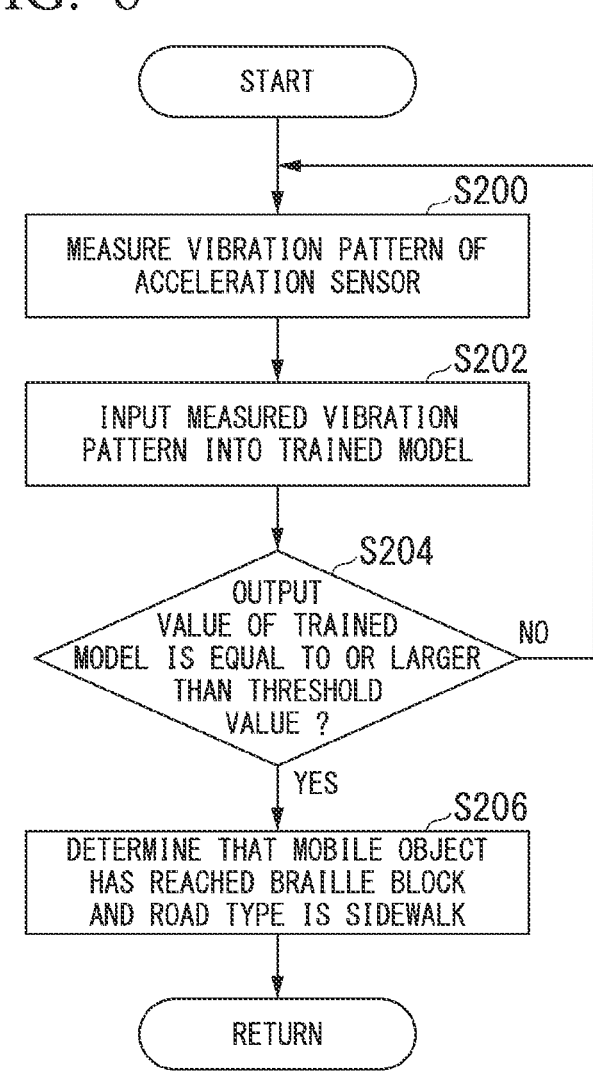
FIG. 8 is a flow chart illustrating another example of a flow of processing to be executed by the road type recognition unit.

FIG. 8 is a flow chart illustrating another example of a flow of processing to be executed by the road type recognition unit 120. First, the road type recognition unit 120 receives the output values of the acceleration sensor 20 in time series, and measures the vibration pattern (Step S200). Next, the road type recognition unit 120 inputs the measured vibration pattern into the above-mentioned trained model to obtain an indicator value indicating whether or not the vibration pattern is a vibration pattern at a time when the mobile object 1 moves on a braille block (Step S202).

Next, the road type recognition unit 120 determines whether or not the output indicator value is equal to or larger than the threshold value (Step S204). When it is determined that the calculated indicator value is not equal to or larger than the threshold value, the road type recognition unit 120 returns the processing to Step S200. On the other hand, when it is determined that the calculated indicator value is equal to or larger than the threshold value, the road type recognition unit 120 determines that the mobile object 1 has reached a braille block, and recognizes the road type as a sidewalk (Step S206). This concludes the processing of this flow chart.

According to the processing of the flow charts described above, the road type recognition unit 120 can recognize the road type by detecting a braille block installed on a sidewalk without depending on an image photographed by an external camera. The processing of the flow charts described with reference to FIG. 7 and FIG. 8 may be combined. For example, the road type recognition unit 120 may execute the determination processing in Step S104 and the determination processing in Step S204, and when affirmative results are obtained in both of the determination processing in Step S104 and the determination processing in Step S204, the road type recognition unit 120 may determine that the mobile object 1 has reached a braille block, or when an affirmative result is obtained in at least one of the determination processing in Step S104 and the determination processing in Step S204, the road type recognition unit 120 may determine that the mobile object 1 has reached a braille block.

Further, the road type recognition unit 120 may recognize the road type by using an output of the object recognition unit 130 (external camera of external detection device 10). More specifically, when the object recognition unit 130 has recognized a braille block, the road type recognition unit 120 sets the recognized braille block as a candidate object for the braille block. Next, the road type recognition unit 120 outputs a command value to the control unit 140, and causes the mobile object 1 to pass through (or touch) the candidate object. The road type recognition unit 120 measures the vibration pattern output by the acceleration sensor 20 when the mobile object 1 has passed through the candidate object, and as described above, compares the vibration pattern with the reference vibration pattern or inputs the vibration pattern into the trained model to determine whether or not the mobile object 1 has reached a braille block. In this manner, it is possible to determine whether or not the road type is a sidewalk by using the image photographed by the external camera.

According to the embodiment described above, the vibration pattern output by the acceleration sensor 20 is used to determine whether or not the mobile object 1 has reached a braille block, and when it is determined that the mobile object 1 has reached a braille block, the road type of the road can be recognized as a sidewalk. In this manner, it is possible to recognize a sidewalk without using a peripheral image of a mobile object.

The embodiment described above can be represented in the following manner.

A control device for a mobile object capable of moving on a roadway and a predetermined area different from the roadway, the control device comprising a storage device storing a program and a hardware processor connected to the storage device, the hardware processor executing the program stored in the storage device to: recognize whether the mobile object is moving on the roadway or the predetermined area based on an output of an acceleration sensor for detecting an acceleration of the mobile object; and recognize that the mobile object is moving on the predetermined area when the mobile object is determined to reach a braille block based on the output of the acceleration sensor.

This concludes the description of the embodiment for carrying out the present invention. The present invention is not limited to the embodiment in any manner, and various kinds of modifications and replacements can be made within a range that does not depart from the gist of the present invention.

What is claimed is:

1. A control device for a mobile object capable of moving on a roadway and a predetermined area different from the roadway, the control device comprising a storage device storing a program and a hardware processor connected to the storage device, the hardware processor executing the program stored in the storage device to:

recognize whether the mobile object is moving on the roadway or the predetermined area based on an output of an acceleration sensor for detecting an acceleration of the mobile object; cause, when recognizing a candidate object for a braille block based on an output of an external condition detection device for detecting an external condition of the mobile object, the mobile object to move on the candidate object; and recognize that the mobile object is moving on the predetermined area when the mobile object is determined to reach the braille block based on the output of the acceleration sensor;

wherein the hardware processor determines whether or not the mobile object has reached the braille block based on a degree of similarity between an output vibration pattern output by the acceleration sensor and a reference vibration pattern at a time when the mobile object moves on the braille block, which is stored in advance, wherein the braille block includes a plurality of types of braille blocks, and wherein the hardware processor determines whether or not the mobile object has reached the braille block based on degrees of similarity between the output vibration pattern output and reference vibration patterns for the plurality of types of braille blocks.

2. The control device for a mobile object according to claim 1, wherein the hardware processor limits a speed of the mobile object moving on the roadway to a first speed, and limits the speed of the mobile object moving on the predetermined area to a second speed lower than the first speed.

3. The control device for a mobile object according to claim 1, wherein the braille block includes a linear braille block and a dotted braille block, and wherein the hardware processor determines whether or not the mobile object has reached the braille block based on degrees of similarity between the output vibration pattern output and reference vibration patterns for the linear braille block and the dotted braille block.

4. The control device for a mobile object according to claim 1, wherein the hardware processor determines whether or not the mobile object has reached the braille block by inputting the output vibration pattern output by the acceleration sensor into a trained model that is trained to receive input of a vibration pattern to output an indicator value indicating whether or not the vibration pattern is a vibration pattern at the time when the mobile object moves on the braille block.

5. The control device for a mobile object according to claim 1, wherein the braille block includes a linear braille block and a dotted braille block, and wherein the hardware processor determines whether or not the mobile object has reached the braille block by inputting the output vibration pattern output by the acceleration sensor into a trained model that is trained to receive input of a vibration pattern to output an indicator value indicating whether or not the vibration pattern is a vibration pattern at the time when the mobile object moves on the linear braille block or the dotted braille block.

6. The control device for a mobile object according to claim 1, wherein the mobile object has a plurality of driving modes including: an assist mode in which one of steering control and an acceleration/deceleration control is performed by an occupant and the other is performed automatically; a manual driving mode in which steering control and the acceleration/deceleration control are performed by the occupant; and an automatic driving mode in which steering control and the acceleration/deceleration control are performed automatically.

7. A control method, which is executed by a computer for controlling a mobile object capable of moving on a roadway and a predetermined area different from the roadway, the control method comprising:

recognizing whether the mobile object is moving on the roadway or the predetermined area based on an output of an acceleration sensor for detecting an acceleration of the mobile object;

causing, when recognizing a candidate object for a braille block based on an output of an external condition detection device for detecting an external condition of the mobile object, the mobile object to move on the candidate object; and recognizing that the mobile object is moving on the predetermined area when the mobile object is determined to reach the braille block based on the output of the acceleration sensor;

wherein the control method determines whether or not the mobile object has reached the braille block based on a degree of similarity between an output vibration pattern output by the acceleration sensor and a reference vibration pattern at a time when the mobile object moves on the braille block, which is stored in advance, wherein the braille block includes a plurality of types of braille blocks, and wherein the control method determines whether or not the mobile object has reached the braille block based on degrees of similarity between the output vibration pattern output and reference vibration patterns for the plurality of types of braille blocks.

8. A non-transitory computer-readable storage medium storing a program for causing a computer for controlling a mobile object capable of moving on a roadway and a predetermined area different from the roadway to:

recognize whether the mobile object is moving on the roadway or the predetermined area based on an output of an acceleration sensor for detecting an acceleration of the mobile object;

cause, when recognizing a candidate object for a braille block based on an output of an external condition detection device for detecting an external condition of the mobile object, the mobile object to move on the candidate object; and recognize that the mobile object is moving on the predetermined area when the mobile object is determined to reach the braille block based on the output of the acceleration sensor;

wherein the computer determines whether or not the mobile object has reached the braille block based on a degree of similarity between an output vibration pattern output by the acceleration sensor and a reference vibration pattern at a time when the mobile object moves on the braille block, which is stored in advance, wherein the braille block includes a plurality of types of braille blocks, and wherein the computer determines whether or not the mobile object has reached the braille block based on degrees of similarity between the output vibration pattern output and reference vibration patterns for the plurality of types of braille blocks.

\* \* \* \* \*